A. BURGER.
FILTER PRESS.
APPLICATION FILED JUNE 6, 1919.

1,409,281. Patented Mar. 14, 1922.

WITNESS
Geo. Schwarz.

INVENTOR
Alfred Burger
BY
Redding & Greeley
ATTORNEYS

UNITED STATES PATENT OFFICE.

ALFRED BURGER, OF BROOKLYN, NEW YORK.

FILTER PRESS.

1,409,281.   Specification of Letters Patent.   Patented Mar. 14, 1922.

Application filed June 6, 1919. Serial No. 302,097.

*To all whom it may concern:*

Be it known that I, ALFRED BURGER, a citizen of Switzerland, residing in the borough of Brooklyn, of the city of New York, in the State of New York, have invented certain new and useful Improvements in Filter Presses, of which the following is a specification, reference being had to the accompanying drawings, forming a part hereof.

In the operation of filter presses, such as are employed in the separation of soluble substances from insoluble substances and in which the material to be treated is delivered in a liquid or semi-liquid condition, the main and intermediate filter plates or frames which support the filter cloths, must be pressed together under very heavy pressure in order that there shall be no leakage between the plates or frames. Commonly the pressure is applied through the medium of a screw which is mounted in a suitable nut supported at one end of the filter press and bears against the movable head, between which and the stationary head of the press the several filter plates or frames are mounted. The screw is commonly rotated by levers applied to it and the operation of either opening the filter press, that is relieving the plates or frames of pressure and separating them to permit the removal of filter cake, and the operation of closing the press, that is of pushing the plates or frames together and subjecting them to the required pressure, require not only considerable time, but the services of several, perhaps three or four, attendants, particularly in the operation of filter presses of large size. It is the object of this invention to provide means whereby such a filter press can be opened or closed with greater facility than is now possible and whereby the entire operation, including the application of the required pressure, can be accomplished, even in filter presses of large size, by one man. In accordance with the invention the worm gear is fixed on the screw shaft and is operated by a worm which is so mounted as to be capable of moving with the worm gear in the direction of movement of the screw shaft, while it is held from revolution about the screw shaft, provision being also made whereby the worm can be disengaged readily from the worm gear to permit the screw shaft to be moved rapidly when pressure is not being applied through it to the filter plates or frames. This part of the invention will be more fully described hereinafter with reference to the accompanying drawings and other features of improvement will also be pointed out. In the drawings—

Figure 1:
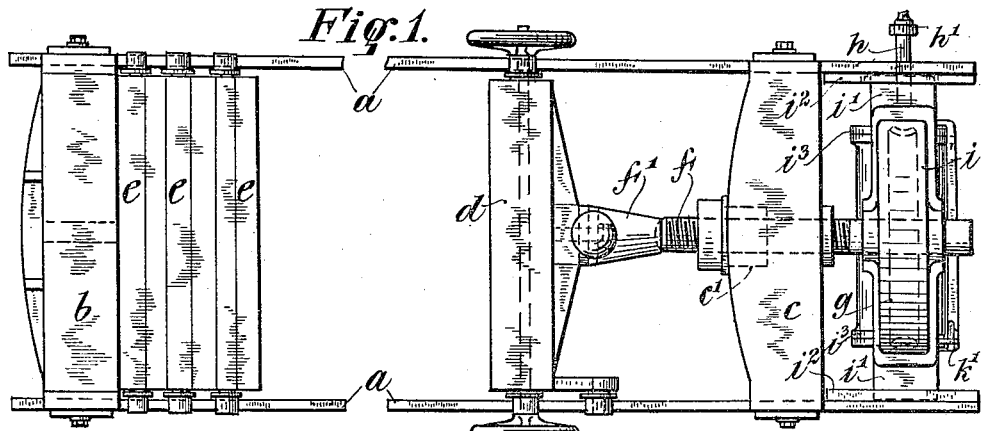
Figure 1 is a top view of so much of a filter press as is necessary to enable the application thereto of the invention to be understood, the press being shown as partly broken off to save space.
Figure 2:
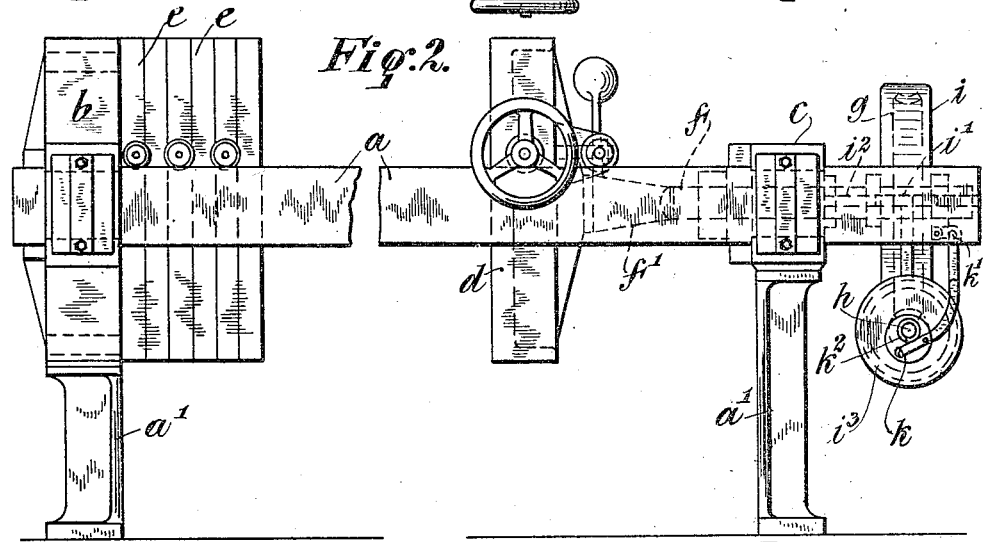
Figure 2 is a view of the same in side elevation.
Figures 3, 4:
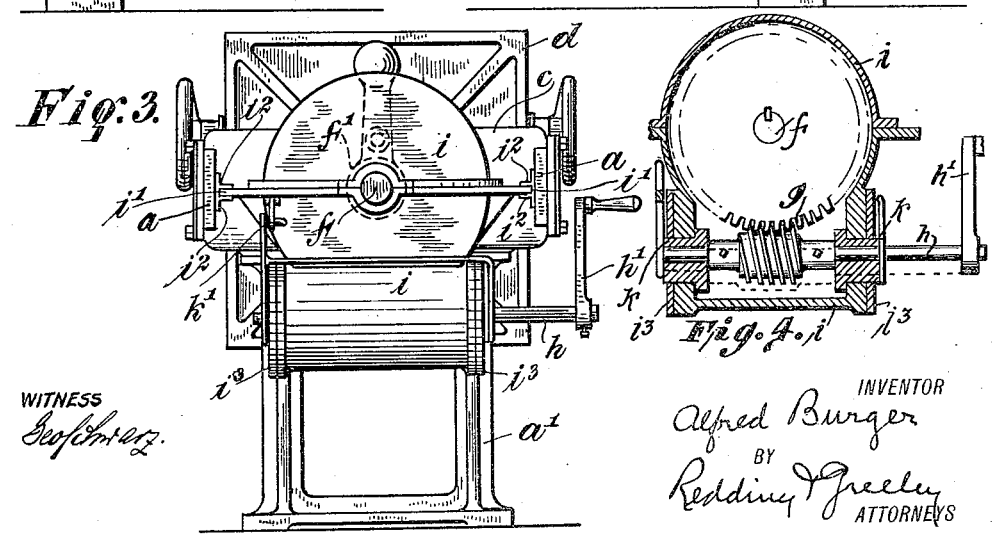
Figure 3 is a view of the same in end elevation as seen from the right hand in Figures 1 and 2.
Figure 4 is a detail view in section through the casing, showing the relation of the worm, worm gear and eccentric bearings.

The filter press to which the invention is applied may be constructed in any usual or suitable manner and may comprise, as shown in the drawing, main frame members $a$, supported upon suitable standards $a'$, a stationary end plate or head $b$, a fixed transverse member $c$, a movable end plate or head $d$ and filter plates or frames $e$ which are supported movably on the main frame members $a$, as well as the movable head $d$. In a nut carried by the fixed transverse member $c$, as indicated at $c'$, is threaded the usual screw shaft $f$ which bears at its forward end, through a removable spacing block $f'$, against the movable head $d$. In the operation of closing the filter press, when all of the filter plates or frames $e$ have been set in position on the main frames $a$, with their filter cloths and appropriate connections, not necessary to be shown herein, the movable head $d$ is moved up against the end of the series of filter plates or frames, the spacing block $f'$ is set in position, and the screw shaft $f$ is rotated to exert the desired pressure against the movable head $d$ and through it to press the filter plates or frames closely together. In the operation of opening the filter press the screw shaft is backed off sufficiently to permit the spacing block $f'$ to be removed, the movable head $d$ drawn back and the filter plates are separated and opened. The construction and the operation thus far described may be all as usual.

The screw shaft $f$ has fixed thereon, in the rear of the fixed transverse member $c$, a worm gear $g$, which is engaged by a transverse worm shaft $h$ provided at one end of a suitable operating handle $h'$. The worm shaft $h$ must be capable of moving in a longitudinal direction with the screw shaft $f$, but it must be held from revolution about the screw shaft. Therefore the worm shaft is mounted in bearings in the end plates of a casing $i$ which has flanges $i'$, mounted in guideways formed by angle irons $i^2$ secured to the inner faces of the frame members $a$. The screw shaft $f$ passes with a free fit through the cheek pieces of the casing. The worm gear and worm are thus held in fixed relation to each other and to the screw shaft $f$, while at the same time they are capable of movement with the screw shaft in the direction of its length. Through the application of hand power to the handle $h'$ of the worm shaft $h$, the screw shaft $f$ can be rotated with great force and the filter plates or frames can be removed and held together under great pressure.

In the opening of the filter press it is desirable that the screw shaft be rotated more rapidly than is possible to the intermediary of the worm shaft and worm gear. To permit this to be accomplished the worm shaft is held in movable bearings so that it can be disengaged from the worm gear and so leave the worm shaft free to be rotated in the usual manner by levers applied directly thereto. As shown, the worm shaft is mounted eccentrically in circular plates $k$ which are mounted rotatably in the end plates $i^3$ of the lower portion of the casing $i$, the plates $k$ being held in position with the worm shaft in mesh with the worm gear by any suitable means such as a bail which engages both of the eccentrics and latch, indicated at $k'$. By a half rotation of the circular plates $k$ in which the bearings $k^2$ for the worm shaft are mounted eccentrically, the worm shaft either can be moved into engagement with the worm gear for operation thereof, or can be moved out of engagement with the worm gear to permit the screw shaft to be rotated more rapidly by the application of levers in the usual manner.

It will be understood that various changes in details of construction and arrangement may be made to suit different conditions of use and that the invention is not restricted to the particular construction shown, except as pointed out in the accompanying claims.

I claim as my invention:

1. The combination of main frames, a movable head mounted thereon, a non-rotating nut, a fixed nut-supporting member therefor, a screw shaft mounted in the nut-supporting member, engaging the non-rotating nut, a worm gear fixed on the screw shaft, a casing, a worm shaft supported in the casing in engagement with the worm gear, and means to prevent revolution of the casing and worm shaft about the screw shaft while permitting the casing and worm shaft to move with the worm gear in the direction of the screw shaft.

2. The combination of main frames, a movable head mounted thereon, a non-rotating nut, a fixed nut-supporting member therefor, a screw shaft mounted in the nut-supporting member engaging the non-rotating nut, a worm gear fixed on the screw shaft, a casing, a worm shaft supported in the casing in engagement with the worm gear, and guides fixed to the main frames to support and hold the casing from revolution while permitting movement thereof with the worm gear in the direction of the screw shaft.

3. The combination of main frames, a movable head mounted thereon, a non-rotating nut, a fixed nut-supporting member, a screw shaft mounted in the nut-supporting member, engaging the non-rotating nut, a worm gear fixed on the screw shaft, a casing, a worm shaft supported in the casing in engagement with the worm gear, a means to prevent revolution of the casing and worm shaft about the screw shaft while permitting the casing and worm shaft to move with the worm gear in the direction of the screw shaft, the casing having eccentrically mounted bearings to support the worm shaft and to permit the same to be moved into and out of engagement with the worm gear.

This specification signed this 5th day of June, A. D. 1919.

ALFRED BURGER.